United States Patent Office 3,591,531
Patented July 6, 1971

---

3,591,531
FOAMED AND FOAMABLE COPOLYMERS
Gunter Schroeder, Ober Ramstadt-Eiche, and Wolfgang Gaenzler, Darmstadt, Germany, assignors to Rohm & Haas G.m.b.H., Darmstadt, Germany
No Drawing. Continuation-in-part of application Ser. No. 655,766, July 25, 1967. This application Sept. 10, 1968, Ser. No. 758,694
Claims priority, application Germany, Sept. 19, 1967, R 46,932
Int. Cl. C08f 47/10, 45/44, 29/36
U.S. Cl. 260—2.5          6 Claims

ABSTRACT OF THE DISCLOSURE

Improved method for making foamable copolymers by dissolving 0.5 to 10 percent by weight of a vinyl polymer in a mixture of urea or dimethylurea and (A) acrylic and methacrylic acid, (B) the amides or nitriles of these acids, and (C) optional additional comonomers, prior to copolymerizing said mixture.

---

This application is a continuation-in-part of copending application Ser. No. 655,766, filed July 25, 1967.

This invention relates to improved methods of making and foaming heat-foamable copolymers and to such foamable and foamed copolymers.

British Pat. 1,045,229 describes heat-foamable copolymers prepared by the free-radical copolymerization of (A) acrylic and/or methacrylic acid with (B) the nitriles and/or amides of these acids, and (C) an optional copolymerizable monomer or monomers, in the presence of urea or dimethylurea. Specifically, the patent teaches copolymerizing, in the presence of 3 to 20 percent by weight urea or N,N'-dimethylurea and an organic radical-forming copolymerization catalyst, (A) 10 to 60 percent by weight acrylic acid, methacrylic acid or a combination thereof with (B) 20 to 60 percent by weight acrylonitrile, acrylamide, methacrylonitrile, methacrylamide or a combination thereof and, optionally, (C) up to about 60 percent by weight of one or more compounds copolymerizable with said cmonomers, e.g., styrene, α-methyl styrene, lower alkyl (particularly methyl and butyl) acrylates and methacrylates, vinyl acetate, itaconic acid, esters thereof, itaconic acid amide or nitrile, and polymerizable heterocyclic compounds such as vinyl pyridine or N-vinyl-2-pyrrolidone, and (D) up to about 5 percent by weight of water. Heat-foamable copolymers are obtainable by heating the monomer mixture to 20° to about 120° C. and these are foamed by subsequent heating to about 150° to 250° C.

While the foamed copolymers thus obtained have a very desirable combination of properties in that they have high thermal dimensional stability, excellent resistance to solvents, low density and good hardness, bending or flexural strength, impact strength, notched-bar impact strength, tensile strength and compression strength, they often lack uniformity of foam structure and pore size. This has the undesirable result that the foamed bodies have zones of different mechanical stability and heat-insulating characteristics. These differences vary from batch to batch because it is impossible to obtain foamed products of completely uniform quality. These differences are even more serious with foamed bodies prepared from synthetic resin granulates inasmuch as these cannot be prepared with densities of less than 150 grams per liter because of an appreciable proportion of granules that are foamed only slightly or not at all.

Although different zones cannot be distinguished visually in the foamed bodies thus obtained, the characteristics of the foam lead to the conclusion that there are one or more phases during the polymerization in the course of which a polymer is formed which is insoluble in the monomer mix, and that this polymer is precipitated or settles and forms a layer or stratum in the final polymer block. It is believed that when the different strata foam at different temperatures, the first stratum to foam, because of its greatly diminished heat conductivity, inhibits the heating and foaming of the adjacent stratum. In a synthetic resin granulate, the portion foamable at low temperature is distributed uniformly and, upon foaming, reduces the flow of heat to the other portions on all sides so that foaming ceases at a relatively high density.

It has now been found that it is possible to obtain uniformly foamed synthetic materials by dissolving in the initially described mixture of monomers and urea component, before commencement of the polymerization, from about 0.5 to about 10 percent by weight, calculated on the weight of polymerizable compounds, of a vinyl copolymer that is soluble in the mixture and at least 10 percent of which is made up of structural units of the formulae

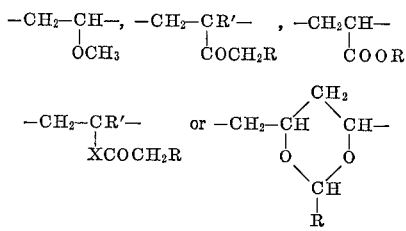

in which R is hydrogen or alkyl, preferably lower alkyl of 1 to 6 carbon atoms, R' is hydrogen or methyl, and X is —O—, phenylene, —COO—alkylene—O—, —COO—alkylene— or —alkylene—O— in which alkylene is preferably alkylene of 1 to 6 carbon atoms, or a combination of such structural units.

Materials resembling those of the aforementioned British patent are taught in French Pat. 1,433,673, which also teaches that compositions solely comprising acrylic acid or methacrylic acid or its amides are suitable for the preparation of foams.

The last-mentioned possibility is illustrated in Example 1 of the French patent. There, a mixture of acrylic acid and urea is polymerized and the resulting polyacrylic acid-urea mixture is foamed at 200° C. A cracked or fissured foam is produced which absorbs water on contact like a sponge.

The foams produced from other polymers described in these French and British patents which contain up to 60 percent of acrylic or methacrylic acid together with acrylonitrile, methacrylonitrile, or acrylamide, also have only a limited resistance to water, particularly if they contain significant quantities of acrylamide. A noticeable shrinkage of all foams of this type in moist air is characteristic, and strongly limits their practical utilization.

The incorporation of cross-linking agents, or the use of high energy radiation which also accomplishes cross-linking, reduces the tendency to shrinkage and distortion under the influence of moisture. Nevertheless, these foams do absorb considerable amounts of water—often many times the weight of the foam—under conditions of high humidity, and particularly when in contact with water. This interferes in those applications in which the foam is selected as a material because of its low density. Also, if a foam which is saturated with water is heated to temperatures over 100° C., the vaporized water causes rupture of the foam pores, bringing about a considerable change in the physical properties of the foam, particularly its heat insulation.

It has been found that foamable copolymers having only a slight tendency toward the uptake of water are obtained if methacrylic acid is employed in their preparation and if the content of this material in the polymer is greater than 60 percent. In particular, such foamable copolymers are obtained by the free-radical copolymerization of a mixture of (A) more than 60 percent by weight, but at most 90 percent by weight, of methacrylic acid, (B) 10 to 40 percent by weight of methacrylonitrile, and (C) up to 30 percent by weight of one or more other comonomers polymerizable therewith, and 5–25 percent by weight (calculated on the weight of the polymerizable compounds) of urea or dimethyl urea. Foams having extremely uniform and fine pore structure are ultimately obtained from such foamable copolymers if, again, from about 0.5 to about 10 percent by weight, calculated on the amount of polymerizable compounds, of a soluble vinyl homopolymer or copolymer containing at least 10 percent of the structural units described earlier herein is combined with said mixture prior to copolymerization.

The vinyl polymer dissolved in monomer mixtures according to the present invention therefore includes units of, e.g., a vinyl ether such as vinylmethyl ether, acrylic acid or an ester thereof such as methyl-, ethyl-, butyl- and hexyl acrylate, a vinyl ester such as vinyl acetate and vinyl propionate, as well as acetylstyrene and acetoxyethyl methacrylate. If the vinyl polymer is a copolymer not composed entirely of the above-identified structural units, it may also have other components which have at least limited solubility and preferably good solubility in the monomer-urea component mixture. Such components include methacrylic acid, lower alkyl and hydroxy alkyl esters thereof, dialkylaminoalkyl methacrylates, N-alkylamides of acrylic and methacrylic acids, N-hydroxy- and N-alkoxyalkylamides of acrylic and methacrylic acids, maleic anhydride, maleic and fumaric acids, alkyl esters of maleic and fumaric acids, N-vinyl pyrrolidone, N-vinylcarbazol, vinyl alcohol, vinyl chloride, styrene and its homologs, as well as minor proportions of acrylonitrile and methacrylonitrile. Such vinyl polymers as vinyl chloride-vinyl acetate copolymers, lower alkyl acrylate-lower alkyl methacrylate copolymers and $\beta$-acyloxyalkyl-methacrylate or acrylate-methacrylate copolymers are particularly suitable for the purposes of this invention.

While no theory has as yet been developed to explain the activity of the vinyl polymer additive, there is basis for assuming that it performs two different functions. On the one hand, it increases significantly the viscosity of the monomer mix, thus inhibiting separation of difficultly soluble components during the initial phase of the polymerization. On the other hand, the additive exerts a dispersing effect which is dependent on the presence of the earlier identified structural units because without them polymers that are readily soluble in the monomer mix are ineffective in achieving the results of the invention. Apparently the dispersing effect inhibits coagulation of insoluble polymer components into drops or flocks having a greater tendency to sedimentation.

As the monomers (C) optionally present in the polymerization mixtures, N-alkyl substituted acrylamide and methacrylamide, acrylic acid esters with alcohols having up to 8 carbon atoms, methacrylic acid esters of the same alcohols, methylene glutaronitrile, styrene and its homologs, vinyl esters of lower carboxylic acids, and heterocyclic vinyl compounds such as vinyl carbazole, vinyl imidazole, or vinyl pyrrolidone can be mentioned. In those compounds in which (A) methacrylic acid is combined in amounts greater than 60 percent with (B) methacrylonitrile, optional component (C) may contain acrylic acid, acrylamide, acrylonitrile, and/or methacrylamide.

Compounds having at least two reactive groups in the molecule can be used in small amounts as cross-linking agents, for example compounds having vinyl, vinylidene, amide-methylol, amide-methylol-ether, carbamide methylol, carbamide methylol-ether, and epoxy groups. Examples of these compounds are ethylene glycol dimethacrylate, divinyl benzene, triallyl cyanurate, allyl acrylate, diallyl phthalate, hexamethylol melamine and its hexa-alkyl ethers, polyepoxy compounds like those prepared from bisphenol A and epichlorohydrin for example, glycidyl acrylate or methacrylate, methylol acrylamide, or butoxy methyl methacrylamide. These compounds are used to advantage in amounts of from 0.1 to 10 percent by weight. For compounds having two or more polymerizable double bonds, amounts in the neighborhood of the lower limit of the aforementioned range can be employed, with larger amounts being used for higher molecular weight compounds or those having at most one carbon-carbon double bond.

The copolymerization of the monomer mixtures containing the vinyl polymer dissolved therein to an unfoamed, thermoplastic copolymer is carried out in the presence of a free-radical catalyst. As catalysts, the known azo and peroxy compounds can be employed, the latter optionally also as components of a redox system. The usual catalysts are azo-bis-isobutyronitrile, azo-bis-isobutyramide, dibenzoyl peroxide, dilauryl peroxide, di-t-butylperoxide, t-butyl permaleinate, and others.

If the monomer mixture is bulk polymerized, it may be advisable, particularly in case of the simultaneous use of larger quantities of urea, for instance 10 to 20% by weight, to add water as a solubilizer in quantities of 1 to 5% by weight, referred to the monomer mixture.

The monomer mixtures are polymerized at a temperature within the range of about 20° C. to 100° C., depending upon a number of factors, particularly the effectiveness of the catalyst chosen for the copolymerization. Temperatures of at least about 40° C. are desirable to avoid unduly prolonged copolymerization times and generally poor results. Temperatures of about 50° C. to 60° C. or 70° C. are preferred for uniformly excellent results. The time of copolymerization varies widely and is readily ascertainable by one skilled in the art. At the preferred temperature of 50° C. to 60° C., 30 to 80 hours are ordinarily sufficient. When redox systems are employed as the catalyst, polymerization temperatures may be much lower, even around room temperature.

Under such conditions about 80% of the monomers copolymerize to yield solid copolymers in which the remaining monomers are dissolved. The monomers are also polymerizable in accordance with conventional practice by tempering the solid copolymer at a somewhat higher temperature, e.g., about 100° to 120° C. for usually about one to four hours, whereby completely copolymerized, solid thermoplastic bodies such as plates are obtained which can then be foamed as such or after granulation.

These thermoplastic copolymers are then capable of being foamed by heating to a temperature of the order of about 150° C. or 180° C. to 250° C. or 280° C., preferably about 200° C. to 230° C. If they are initially, i.e., in the unfoamed state, in the form of plates or the like, the resulting foamed copolymers have densities of the order of about 20 to over 100 grams per liter, depending upon the choice of amount of foaming agent and preselected volume. The plastic can be broken into granules having a particle size, for example, of from two to three millimeters and then foamed in this form to produce structures of a complicated shape.

Resin granulates are preferably foamed in two steps, the first step resulting in a prefoamed granulate that is converted to a foamed body in the second step. The method of the invention is particularly advantageous for the foaming of granulates because of the absence of unfoamed portions in foamed bodies produced therefrom. It is believed that a cyclization takes place by intramolecular rearrangement if component B is nitrile and by condensation to a cyclic imide grouping if component B is an amide. The foamed product loses its thermoplasticity more or less completely.

The density of the final foam product depends on a number of factors which in part must be kept in mind in the preparation of the foamable intermediate. Very dense foams are prepared from materials having a small urea content and a high proportion of a cross-linking agent particularly an agent having two or more polymerizable double bonds. Hight foam densities can also be achieved by foaming in a pressure-resistant (but not gas-proof) mold which is filled with a correspondingly large amount of a foamable material in sheet form or in granulated form. Foams of low density are obtained from foamable material with a high urea content, for example 20 percent, or with a water content in the range of from 2–5 percent. In the case of the foaming of granules, this can be replaced by a treatment of the material with water or steam.

All the thermoplastic copolymers which can be produced in accordance with the invention have the property in common that upon the heating which is necessary for the foaming, an imidization occurs within the macromolecule and ring-shaped acryl- or methacrylimide units are developed. A prerequisite for this cyclization reaction is that the groupings which participate in the ring-formation be spatial neighbors. It is known that the two components in a copolymer consisting of equal molar proportions of for instance methacrylic acid and methacrylonitrile are present in the macromolecule in a statistical distribution, i.e., their distribution is not strictly alternating. Accordingly, even under these conditions a quantitative formation of imides during the heating cannot be expected. In addition to the intramolecular rearrangement which takes place during the heating, an intermolecular imide formation and thus a slight cross-linking of the foamed final product also takes place to a slight extent. This is of practical importance for the dimensional stability and solvent-resistance of the final product.

The development of the building blocks of the formula

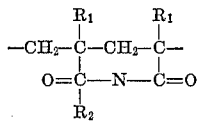

in which $R_1$ is hydrogen or $CH_3$ and $R_2$ is hydrogen or a lower alkyl radical, which building blocks determine the properties of the new product, can be effected in accordance with different cyclization mechanisms. The ring-shaped imide can be produced from acrylic or methacrylic acid, an acrylo- or methacrylonitrile from acrylamide or methacrylimide and a lower alkyl acrylate or methacrylate or from acrylamide or methacrylamide and acrylic or methacrylic acid. Acrylates and methacrylates which are present in the structure of the plastics prepared in accordance with the invention can participate in the cyclization reaction which takes place upon heating and/or they act as comonomers which modify the properties of the final product.

The method of this invention can be modified in a number of ways without departing from its essential features. This includes the addition of plasticizers, such as dibutylphthalate, the introduction of known flame-inhibiting additives, such as phosphoric acid, phosphoric esters or chloro paraffins, and the addition of filling materials which improve the mechanical strength of the resultant foam.

In particular, the addition of silica gel or asbestos flour to those monomer mixtures containing more than 60 percent of methacrylic acid produces foam plastics, in the absence of vinyl polymer additions, whose properties are similar to those formed with polymer addition. These materials are added to the polymerizing mixture in such amounts as will form a uniform paste. As a rule, from 5 to 10 percent by weight, calculated on the polymerizable compounds, are sufficient for this purpose.

Plastics produced in accordance with the present invention by the copolymerization of acrylic or methacrylic acid with methacrylonitrile and styrene or methylmethacrylate in a monomer mix containing a vinyl chloride-vinyl acetate, ethyl acrylate-methyl methacrylate or β-acetoxyethyl methacrylate-methylmethacrylate copolymer are particularly preferred due to the good mechanical properties of the foam produced therefrom. Products prepared from acrylic or methacrylic acid, acrylamide and methylmethacrylate with the aforementioned vinyl copolymers produce white foams of excellent temperature stability and resistance to solvents.

The plastics according to the process of the present invention which contain more than 60 percent of methacrylic acid can be made into foams which do not distort under conditions of high humidity or by storage in water and which do not absorb significant quantities of water. They therefore can withstand sudden increases in temperature to above 100° C. without damage. The resistance to deformation by heat is maintained to far over 200° C. Foams of this kind prepared with a density of from 100–250 g./l. show a high resistance and are adaptable for the preparation of pressure-resistant structural elements having a sandwich structure, for example for the manufacture of containers. The materials can be worked like wood and load like wood under pressure. Also, the foams prepared with a density between 40 and 100 g./l. permit self-supporting constructions. The exceedingly fine foam structure imparts outstanding heat insulation qualities, particularly to the materials of low density. For diverse fields of use, it is also an advantage that the foams are completely white. Thanks to their outstanding resistance to solvents, the foams can be lacquered, adhered, or treated with asphalt.

Although the processes which take place upon the heating of the new thermoplastic copolymer are not yet entirely known, it is believed that the urea component, i.e., urea or dimethyl urea, not only has the role of a blowing agent, which decomposes for instance into ammonia and carbon dioxide, but that the urea and/or its decomposition products also participate as reactants in the development of the foamed plastics produced in accordance with the invention. Infra-red spectrographic investigations have indicated that, other conditions being equal, the absence of a urea component results in products having acid anhydride groups while, with the simultaneous use of a urea component, such groups are transformed into the imide groups.

The advantages and further details of the process and products of this invention will become more apparent from the following examples, in which the relative proportions of the comonomers and vinyl polymers are set forth in parts by weight and the term "tempered" is used in the sense in which it was used earlier, unless otherwise noted.

EXAMPLE 1

Five parts of a vinyl chloride-vinyl acetate copolymer having a vinyl acetate content of about 40% are dissolved in a mixture of 55 parts of methacrylonitrile, 45 parts of methacrylic acid and 5 parts of urea. After addition of 0.2 part of dibenzoylperoxide, the solution is polymerized in 16 hours at 60° C. to a turbid, yellow plate and then tempered at 100° C. for three additional hours.

By heating this plate to 220° C. for two hours, it foams to an even, uniform foamed plate with a density of 29 grams per liter.

EXAMPLE 2

Five parts of a 30% dispersion (corresponding to 1.5 parts of polymer) of an ethyl acrylate-methyl methacrylate copolymer having an ethyl acrylate content of about 67% are added to a mixture of 55 parts of methacrylonitrile, 45 parts of methacrylic acid and 5 parts of urea. After addition of 0.2 part of dibenzoylperoxide, the mixture is polymerized in 40 hours at 60° C. to a turbid plate and then tempered at 100° C. for three additional hours.

Upon heating to 220° C. for one hour, the polymer plate is foamed to a smooth, uniform foamed plate having a density of about 37 grams per liter.

EXAMPLE 3

Two parts of a copolymer of 20 parts of β-acetoxyethyl methacrylate and 80 parts of methylmethacrylate are dissolved in 45 parts of methacrylic acid. To this solution, 55 parts of methacrylonitrile, 5 parts of urea and 0.2 part of dibenzoylperoxide are added, and the mixture is polymerized in 48 hours at 60° C. to a turbid, yellow plate and then tempered at 100° C. for three additional hours.

Upon heating to 240° C. for one hour, the plate is foamed to a smooth, uniform foamed plate having a density of about 30 grams per liter.

EXAMPLE 4

Five parts of a copolymer of 15 parts of β-acetoxyethyl methacrylate and 85 parts of methylmethacrylate are dissolved in 45 parts of methacrylic acid. To this solution, 55 parts of methacrylonitrile, 5 parts of urea and 0.2 part of dibenzoylperoxide are added, and the mixture is polymerized in 40 hours at 60° C. to a turbid, light-yellow plate and then tempered at 100° C. for three additional hours.

Upon heating to 240° C. for one hour, the plate is foamed to a smooth, uniform foamed plate having a density of about 30 grams per liter.

EXAMPLE 5

The starting material for the preparation of a foam was prepared by heating the following components for 20 hours at 60° C. and for 3 hours at 100° C. in a glass chamber to form a synthetic resin in the form of a sheet having a thickness of one centimeter:

| | Parts |
|---|---|
| Methacrylic acid | 70 |
| Methacrylonitrile | 30 |
| Polyvinyl butyral | 5 |
| Urea | 6 |
| Dibenzoyl peroxide | 0.2 |

The sheet obtained in this manner was then heated for one hour at 220° C. in a circulating hot-air warming oven. In this way, a white, finely-pored foam was obtained which was subsequently heated for one hour at 180° C. Its properties are compared in the following table with the properties of a material obtained according to Example 8 of English Patent 1,045,229.

|  | Material of this example | Material of Example 8 of British Patent 1,045,229 |
|---|---|---|
| Density (kg./m.³) | 58 | 67 |
| Resistance to deformation by heat according to DIN 53424 (under bending stress), ° C | 200 | 174 |
| Water uptake in water at 20° C. (weight percent): | | |
| 24 hours | 4 | 45 |
| 7 days | 50 | 170 |
| Water uptake from air at 100 percent relative humidity at 20° C. (weight percent): | | |
| 24 hours | 1.6 | 2.8 |
| 7 days | 4.5 | 11.5 |
| Behavior on 24-hour storage in organic solvents: | | |
| Methanol | Unchanged | Collapsed |
| Furfural | Unchanged | (¹) |
| Tetrahydrofuran | Unchanged | (¹) |

¹ Soaked and shrunken.

EXAMPLE 6

By polymerizing a mixture of

| | Parts |
|---|---|
| Methacrylic acid | 63 |
| Methacrylonitrile | 37 |
| Polyvinyl butyral | 5.3 |
| Urea | 5 |
| Dibenzoyl peroxide | 0.2 | under the same conditions as in Example 5, a plastic was obtained which by heating for 30 minutes at 210° C.–250° C. was transformed into a white, uniform, fine-pored foam plate having a density of 35 kg./cm.³ and a resistance to deformation by heat according to DIN 53424 (under bending stress) of 200° C.

EXAMPLE 7

Example 6 was repeated except that 5 parts of N,N'-dimethyl urea were employed in place of urea. The plastic obtained was foamed at 210° C. to form a foam having a density of 55 kg./cm.³.

EXAMPLE 8

A plastic used as a starting material for the preparation of a foam was prepared from the following components by heating for 20 minutes at 60° C. and for three hours at 100° C.

| | Parts |
|---|---|
| Methacrylic acid | 70 |
| Methacrylonitrile | 30 |
| Polyvinyl butyral | 5 |
| Water | 1.1 |
| Urea | 15 |
| Dibenzoyl peroxide | 0.2 |

The plastic was broken and granules having a diameter of 2–4 millimeters were segregated by sieving. These were foamed to form a uniform white foam block having a density of 50 kg./cm.³ by heating at 240° C. and subsequently post-heating for one hour at 180° C. in a closed rectangular form.

EXAMPLE 9

A foamable resin was made, under the conditions of Example 1, from the following materials:

| | Parts |
|---|---|
| Methacrylic acid | 80 |
| Methacrylonitrile | 20 |
| Methyl methacrylate | 10 |
| Polyvinyl butyral | 5 |
| Urea | 10 |
| Dibenzoyl peroxide | 0.2 |

This resin could be foamed to a uniform white foam block having a density of 80 kg./m.³ by heating in a closed rectangular mold for one hour at 210° C.

EXAMPLE 10

A foamable plastic in the form of a plate about 1 centimeter thick was obtained by the polymerization of a fluid mixture of:

| | Parts |
|---|---|
| Methacrylic acid | 65 |
| Methacrylonitrile | 35 |
| Urea | 5 |
| Polyvinyl butyral | 2 |
| Water | 1.5 |
| Dibenzoyl peroxide | 0.2 | by warming for 20 hours at 60° C. and for 3 hours at 100° C. in a glass chamber.

By heating for ½ hour at 215° C. and for a subsequent hour and one-half at 180° C. in a circulating hot-air warming oven, this plate was converted into a white finely-pored foam having a density of about 40 kg./m.³.

EXAMPLES 11–18

Example 10 was repeated except that polyvinyl butyral was replaced by the additives shown below in the table in the amounts there given. The table further reports the density of the foam obtained.

| Example | Additive | Parts | Foam density (kg./m.³) |
|---|---|---|---|
| 11 | β-Acetoxyethyl methacrylate/methyl methacrylate copolymer (20:80 percent by weight). | 5 | 65 |
| 12 | Acetylstyrene/methyl methacrylate copolymer (30:70 parts by weight). | 3 | 85 |
| 13 | Vinyl acetate/vinyl chloride copolymer (40:60 percent by weight). | 4 | 55 |
| 14 | Methylvinyl ketone/methyl methacrylate copolymer (40:60 percent by weight). | 2 | 90 |
| 15 | 40 percent aqueous dispersion of an ethyl acrylate/methyl methacrylate copolymer (15:85 percent by weight). | 5 | 120 |
| 16 | Polyvinyl methyl ether | 5 | 85 |
| 17 | Silicic acid aerogel | 7 | 45 |
| 18 | Asbestos flour | 9 | 70 |

What is claimed is:
1. In a process for preparing a heat-foamable thermoplastic copolymer which comprises copolymerizing, in the presence of 3 to 25 percent by weight of urea or dimethylurea and of a catalytically effective amount of an organic free-radical forming catalyst, a monomer mixture comprising (A) more than 60 percent by weight to 90 percent by weight of methacrylic acid, (B) 10 to 40 percent by weight of methacrylonitrile, and (C) up to 30 percent by weight of another monomer or other comonomers copolymerizable with (A) or (B), the improvement which comprises adding to the monomer mixture, before copolymerization, from about 0.5 to about 10 percent by weight of a vinyl polymer soluble in said monomer mixture, at least 10 percent of which vinyl polymer is made up of structural units of the formulae

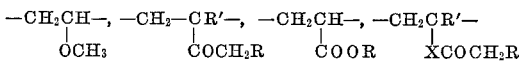

or

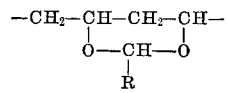

in which R is hydrogen or alkyl of 1 to 6 carbon atoms, R' is hydrogen or methyl, and X is —O—, phenylene, -COO-alkylene-O-, COO-alkylene-, or -alkylene-O-, in which alkylene has 1 to 6 carbon atoms, or combinations of such structural units.

2. A process as in claim 1 wherein said monomer mixture additionally comprises 1 to 5 percent by weight of water.

3. A process as in claim 1 wherein said vinyl polymer is polyvinyl butyral.

4. A foamable copolymer prepared as defined in claim 1.

5. A process for forming a heat-foamed stable copolymer having excellent moisture resistance which comprises heating the foamable copolymer of claim 1 to a temperature of about 150° C. to 250° C. to foam said foamable copolymer.

6. A foamed copolymer prepared as defined in claim 5.

References Cited

UNITED STATES PATENTS

| 3,001,956 | 9/1961 | Meinel | 260—2.5 |
| 3,311,575 | 3/1967 | Graham | 260—2.5 |
| 3,417,038 | 12/1968 | Soltys | 260—2.5 |

FOREIGN PATENTS

| 1,368,383 | 6/1964 | France | 260—2.5 |

MURRAY TILLMAN, Primary Examiner
W. J. BRIGGS, Sr., Assistant Examiner

U.S. Cl. X.R.

260—32.4, 881, 884, 885, 886

PO-1050
(5/69)

UNITED STATES PATENT OFFICE
CERTIFICATE OF CORRECTION

Patent No. 3,591,531          Dated July 6, 1971

Inventor(s) Schroeder and Gaenzler

It is certified that error appears in the above-identified patent and that said Letters Patent are hereby corrected as shown below:

In the Heading, after "Claims priority," replace "application Germany" by --applications in Germany, July 29, 1966, R 43,794 and--.

Signed and sealed this 2nd day of November 1971.

(SEAL)
Attest:

EDWARD M. FLETCHER, JR.          ROBERT GOTTSCHALK
Attesting Officer          Acting Commissioner of Patents

UNITED STATES PATENT OFFICE
CERTIFICATE OF CORRECTION

Patent No. 3,591,531      Dated July 6, 1971

Inventor(s) Schroeder et al.

It is certified that error appears in the above-identified patent and that said Letters Patent are hereby corrected as shown below:

In Column 1, line 43, "cmonomers" should read --comonomers--; in Column 5, in the formula at lines 35 to 40, "$O=\overset{|}{C}-\overset{|}{N}-\overset{|}{C}=O$" should read -- $O=\overset{|}{C}-\underset{R_2}{\overset{|}{N}}-\overset{|}{C}=O$ --; in Column 5, line 46, "an" should read --and-- and in line 47, "methacrylimide" should read --methacrylamide--; in Column 8, line 27 (Example 8), "20 minutes" should read --20 hours--.

Signed and sealed this 25th day of January 1972.

(SEAL)
Attest:

EDWARD M. FLETCHER, JR.
Attesting Officer

ROBERT GOTTSCHALK
Commissioner of Patents